(12) United States Patent
Zanthoff et al.

(10) Patent No.: US 7,569,196 B2
(45) Date of Patent: Aug. 4, 2009

(54) DEVICE FOR CARRYING OUT LIQUID REACTIONS WITH FINE-GRAINED SOLID CATALYSTS AND METHOD FOR THE USE THEREOF

(75) Inventors: Horst-Werner Zanthoff, Mülheim (DE); Dietrich Maschmeyer, Recklinghausen (DE); Thorsten Schwärtzke, Marl (DE); Udo Robers, Legden (DE); Anita Völkel, Herten (DE)

(73) Assignee: OXENO Olefinchemie GmbH, Marl (DE)

( * ) Notice: Subject to any disclaimer, the term of this patent is extended or adjusted under 35 U.S.C. 154(b) by 379 days.

(21) Appl. No.: 10/579,471

(22) PCT Filed: Sep. 16, 2004

(86) PCT No.: PCT/EP2004/052202
§ 371 (c)(1),
(2), (4) Date: May 15, 2006

(87) PCT Pub. No.: WO2005/046857
PCT Pub. Date: May 26, 2005

(65) Prior Publication Data
US 2007/0104627 A1    May 10, 2007

(30) Foreign Application Priority Data
Nov. 15, 2003    (DE) .................................. 103 53 391

(51) Int. Cl.
*B01J 7/02*        (2006.01)
*B01J 8/00*        (2006.01)
*B01D 21/00*    (2006.01)
*B01D 25/32*    (2006.01)
*B01D 24/00*    (2006.01)

(52) U.S. Cl. .................. 422/239; 422/140; 210/225; 210/226; 210/702; 210/721; 210/738; 366/97; 366/98; 366/99

(58) Field of Classification Search .................. 422/239, 422/140, 200; 210/633, 702, 721, 738, 739, 210/225, 226, 259, 294, 295, 299, 321.64, 210/321.72; 366/64, 65, 66, 96, 97, 98, 99, 366/101, 103
See application file for complete search history.

(56) References Cited

U.S. PATENT DOCUMENTS 2,526,651 A    10/1950    Garbo
(Continued)

FOREIGN PATENT DOCUMENTS

| EP | 0 609 079 | 8/1994 |
|---|---|---|
| EP | 1 230 973 | 8/2002 |
| WO | 00/43098 | 7/2000 |

OTHER PUBLICATIONS

U.S. Appl. No. 10/579,471, filed May 15, 2006, Zanthoff et al.
U.S. Appl. No. 10/511,595, filed Nov. 2, 2004, Grass et al.

*Primary Examiner*—Walter D Griffin
*Assistant Examiner*—Huy-Tram Nguyen
(74) *Attorney, Agent, or Firm*—Oblon, Spivak, McClelland, Maier & Neustadt, P.C.

(57) ABSTRACT

A reactor for carrying out catalyzed liquid reactions in which the catalyst is present as a dispersion in the reaction zone. The reactor includes at least one inlet and outlet, with all starting materials being fed in via the inlet and all products being discharged via the outlet. The inlet and outlet can be switched so that an exit previously serving as the outlet is utilized as an entrance serving as the inlet and at the same time an entrance previously serving as the inlet is utilized as an exit serving as the outlet. The inlet and outlet each include a filter element that keeps the catalyst in the reactor. The reactor also includes a device that ensures homogeneous distribution of the catalyst and the starting materials in the reactor. This reactor can carry out reactions at a high solids content without the catalyst having to be separated off from a product stream in an extra process step and without regular cleaning and thus shutdown of the process being necessary.

17 Claims, 4 Drawing Sheets

U.S. PATENT DOCUMENTS

| | | |
|---|---|---|
| 3,431,085 A | 3/1969 | Cimerol et al. |
| 3,667,487 A * | 6/1972 | Schoenbeck et al. ........ 134/108 |
| 4,994,332 A * | 2/1991 | Coin et al. .................... 429/27 |
| 5,935,418 A | 8/1999 | Chakrabarty et al. |
| 2004/0097773 A1 | 5/2004 | Beckmann et al. |
| 2004/0260113 A1 | 12/2004 | Bueschken et al. |
| 2005/0038285 A1 | 2/2005 | Maschmeyer et al. |
| 2005/0101800 A1 | 5/2005 | Bueschken et al. |
| 2006/0036121 A1 | 2/2006 | Kaizik et al. |
| 2006/0041167 A1 | 2/2006 | Grass et al. |

* cited by examiner

DEVICE FOR CARRYING OUT LIQUID REACTIONS WITH FINE-GRAINED SOLID CATALYSTS AND METHOD FOR THE USE THEREOF

The present invention relates to an apparatus for carrying out liquid reactions, in particular liquid-liquid or liquid-gas reactions, in the presence of finely particulate solid catalysts.

It is known that many chemical reactions can be carried out at elevated pressure and with addition of a dispersed or suspended catalyst. The fluid reactants can be introduced into the reactor in a liquid phase, in a plurality of liquid phases or additionally as reaction gas. Examples of liquid reactions are: oligomerizations, metatheses, alkylations or isomerizations, and also heterogeneous biocatalytic reactions.

In carrying out such reactions and also in the determination of the intrinsic reaction kinetics, the use of finely dispersed catalyst particles is preferred, since this can minimize the pressure drop compared to a fixed-bed reactor containing catalyst pellets. In addition, pore diffusional limitition is largely avoided as a result of the small particle size and in the case of exothermic reactions there are usually no local temperature peaks as in a fixed-bed reactor, since the fluidized catalyst leads to isothermal reactor characteristics as a result of convective mixing.

In the reactions, the solid catalyst is generally not consumed by the reaction leading to the product, so that the catalyst does not have to be discharged from the reaction zone.

For this reason, such suspension reactions are frequently carried out with the catalyst being retained in the reactor by means of sintered metal or ceramic frits or by means of wire mesh constructions. A problem here is the buildup of a filter cake on these filter elements which occurs over time, especially at a high solids content in the liquid, since this adversely affects uniform distribution of the catalyst and leads to blockage of the reactor. The buildup of the filter cake can usually not be prevented even by means of stirrers. The reaction therefore has to be shut down periodically and the filter elements have to be cleaned.

In a variant of this procedure, it was proposed that gas/liquid reactions (hydrogenative reaction) be carried out with installation of a further filter element through which the hydrogen is added (U.S. Pat. No. 5,935,418). After a prescribed interval, the two filter elements are switched so that the reaction liquid is now removed through the $H_2$ filter element and the hydrogen is now introduced via the exit filter element. However, maintenance of a precise liquid level in the reactor is problematical in this case, because there are two independent inflows into the reactor. Particularly at high linear velocities and low residence times, as are necessary for kinetic studies, such a principle is encumbered with problems. In the case of a liquid reaction carried out in this way, inert gas would have to be fed in, which represents an expense which is unnecessary per se.

To avoid these problems, it has frequently been proposed that the catalyst not be retained in the reactor but instead be discharged with the product and be separated off from the liquid phase using classical separation apparatuses such as decanters, filters, candle filters, hydrocyclones or the like (e.g. U.S. Pat. No. 3,901,660). A disadvantage of these processes is that it is subsequently necessary to handle a moist solid or concentrated suspensions if the solid is to be returned as catalyst to the reactor system. Furthermore, it is difficult to control the amount of catalyst to be recirculated when the reaction is to be carried out continuously without fluctuating conversions in the reactor, since catalyst is taken contionuously from the reaction zone.

An alternative which has been proposed is separation of catalyst and liquid outside the reactor by means of crossflow filtration, in which part of the suspension is branched from the reactor and recirculated through a microfilter which operates under the same pressure and according to the crossflow principle and the liquid reaction product is taken off as filtrate at the microfilter (DE 32 45 318). A disadvantage here is that a filter cake is likewise built up with time and has to be removed periodically, which leads to shutdown of the plant. Furthermore, it is sometimes necessary to reduce the temperature of the reaction mixture before it enters the filter unit since the known filter materials can only be operated at limited temperatures.

All the external separation methods mentioned have the disadvantage that a suspension of solids has to be conveyed. This requires additional pumps whose life is limited further by abrasion caused by solids.

When using sparged tanks or bubble columns operated in the slurry mode, as have been proposed, for example, for the Fischer-Tropsch synthesis, the circulating stream may be able to be generated by the freshly injected liquid or the rising bubbles. However, problems in controlling the reaction can occur here because of the often unsatisfactory mass transfer and heat transfer processes between the liquid phases and/or the solid. Lower conversions or, in the case of exothermic reactions, heat profiles in the reactor which hinder the reaction have to be expected.

It is therefore an object of the invention to find a process and an apparatus in which the catalyst can be utilized in its fully effective form in the reaction zone without the process having to be interrupted periodically for regeneration or cleaning. At the same time, the crude product of the reaction should be obtained continuously as a solids-free liquid.

It has now surprisingly been found that it is possible to obtain a solids-free product stream continuously from a reaction mixture in which a pulverulent catalyst is present as a fine dispersion when the reaction is carried out in a reactor which has a filter element at the inlet and outlet and the inlet and outlet can be switched over so that the inlet can serve as outlet and the outlet can serve as inlet. Switching the outlet and inlet results in any deposits present on the filter element being rinsed back into the reaction zone.

The present invention accordingly provides a reactor for continuously operating catalyzed liquid reactions in which the catalyst is present as a dispersion in the reaction zone, wherein the reactor has at least one inlet and one outlet, with all starting materials being fed in via an inlet and all products being discharged via an outlet, and inlet and outlet are provided with a means which allows inlet and outlet to be switched so that an exit which has previously served as outlet is utilized as an entrance serving as inlet and at the same time an entrance serving as inlet is utilized as an exit serving as outlet, and inlet and outlet are each provided with a filter element which keeps the catalyst in the reactor and the reactor is provided with a device which ensures homogeneous distribution of the catalyst and the starting materials in the reactor.

The present invention likewise provides a process for continuously carrying out catalyzed liquid reactions in at least one reactor in which the catalyst is present as a dispersion in the reaction zone, wherein the process is carried out in at least one reactor according to the invention.

The present invention also provides an assembly of at least two reactors according to the invention which are connected in parallel and provides for the use of the process of the invention, a reactor according to the invention or an assembly according to the invention for carrying out a high-throughput screening. In general and for the purposes of the present invention, high-throughput screening refers to the rapid testing of catalyst compositions and properties in order to optimize their suitability for industrial use for the reaction or class of reactions examined, and also to optimize the reaction parameters necessary for this purpose (e.g. pressure, temperature, volume flow, hydrodynamic residence time), in apparatuses which are operated in parallel and are preferably miniaturized and automated.

The apparatus of the invention and the reactor of the invention have the following important advantages:

External removal of the catalyst is not necessary. The problems which can occur during pumping of suspensions, e.g. limited pump life, deposits in pipes, etc., are thus eliminated.

Complicated process steps such as transport of a liquid having a high solids loading, cooling and depressurization to filter-compatible pressures and feeding the catalyst back into the reactor are dispensed with.

The reactor of the invention can in principle be realized in any commercial stirred tank reactor having at least one inlet and one outlet.

The product (filtrate) obtained from the apparatus is generally free of solids, so that fouling of downstream process equipment, e.g. a distillation unit, is eliminated.

The pressures and temperatures which can be employed are limited only by the rating of the vessel and the materials properties of the filter elements used.

The reactor of the invention displays the same characteristics as a stirred tank reactor.

The reactor of the invention can also be used for reactions in which the proportion of catalyst is more than 20% by volume, preferably more than 30% by volume and particularly preferably more than 40% by volume.

The apparatus of the invention is also advantageous for determining the intrinsic reaction kinetics, because use of finely dispersed catalyst particles is preferred since this enables the pressure drop to be minimized compared to a fixed bed reactor using catalyst pellets. In addition, pore diffusion inhibition is largely avoided as a result of the small particle size and in the case of exothermic reactions there are usually no local temperature peaks as in a fixed-bed reactor, since the fluidized catalyst leads to isothermal reactor behavior as a result of convective mixing. The reactor of the invention enables reactions using finely divided small catalyst particles to be carried out in a simple fashion, which is why such reactor/reaction combinations are particularly useful for determining the intrinsic reaction kinetics which are important for the scale-up of reactors.

The apparatus of the invention and the process of the invention are described below without the invention being restricted to these embodiments.

The reactor of the present invention for continuously operating catalyzed liquid reactions in which the catalyst is present as a dispersion in the reaction zone has at least one inlet and at least one outlet, with all starting materials being fed in via an inlet and all products being discharged via an outlet. Inlets and outlets are provided with a means which allows inlets and outlets to be connected so that an exit which has previously served as outlet is utilized as an entrance serving as inlet and at the same time an entrance serving as inlet is utilized as an exit serving as outlet. The inlets and outlets are each provided with a filter element which keeps the catalyst in the reactor. In addition, the reactor is provided with a device which ensures homogeneous distribution of the catalyst and the starting materials in the reactor. Such a device can be, for example, a motor-driven stirrer, for example an impeller stirrer.

The means of switching inlet and outlet can be, for example, a four-way valve in which there are two pairs of connected exits. If more than one outlet and one inlet are present, a valve having a correspondingly larger number of exits has to be used or a four-way valve is present for each pair of inlets and outlets. The valves used can be operated manually or automatically (e.g. electrically or pneumatically), with regulation being able to be carried out via a conventional process control system.

The means of switching inlet and outlet can be provided with a device which ensures periodic switching over. However, it can also be advantageous for the reactor to be equipped with a pressure sensor which is connected to the process control system which then controls the switching means as a function of the pressure in the reactor.

The filter elements present at the inlets and outlets of the reactor can comprise as filter-active materials, for example, a sintered metal frit, a ceramic frit, a ceramic composite, a ceramic monolith, a polymer membrane, a nonwoven, knitted or woven metal wire construction or can consist entirely of these materials.

Depending on the reactions to be carried out in the reactor, it can be advantageous or necessary for the reactor to have a facility for introducing or removing heat energy. Such facilities can be cooling or heating coils which are located in the interior of the reactor and/or in its wall and through which an appropriate cooling or heating medium flows.

The filter elements can be hollow bodies of various geometries. These can be planar plates or columns having variously shaped cross sections, for example a circle, ellipse, triangle, rectangle, etc. The filter elements can be shaped, e.g. hollow rings or parts of hollow walls (shell) of a cylinder. At least two filter elements are present in the reactor of the invention. The two or more filter elements preferably have the same size or at least have an equal area of filter-active material, so that it is ensured that when inlet and outlet are switched, there is not an unintended pressure buildup because of different flow cross sections in the inlet and outlet. The filter-active materials can be present on the insides and/or the outsides of the filter elements. The filter elements can be of such a size and shape that on assembly they form only part of a cylinder shell, or else they can be of such a size that they form a complete hollow cylinder made up of the filter elements. In the simplest case, a complete hollow cylinder is composed of two parts. However, for hydrodynamic reasons, it can also be advantageous for the complete hollow cylinder to be composed of an even number greater than two of sections, with a filter element serving as inlet preferably having two filter elements serving as outlets adjacent to it. It can also be advantageous to arrange filter elements serving as inlet and outlet in an irregular fashion. It is possible for the inlets and outlets to the filter elements to be combined and connected to only one means of switching. However, it has been found to be advantageous when a plurality of filter elements are present for each inlet to be connected via a means of switching to only one outlet so as to ensure that flow through all inlet and outlets and thus also the filter elements is at the same pressure (mass flow). The means of switching can nevertheless be designed so that it can simultaneously perform a plurality of the switching operations mentioned.

In a preferred embodiment, the reactor of the invention has filter elements which are shaped like parts of (hollow) walls (the shell) of a cylinder (in these filter elements, the permeate is taken off from the interior of the hollow shell of the cylinder while the retentate is retained on the inside and/or outside of the part cylinders). Furthermore, the reactor in this preferred embodiment has at least one additional stirrer on the inside and/or outside (surface), preferably on the inside and outside (surface) of the cylinder, which runs past the surface of the filter elements, in particular the filter-active areas of the filter elements, at a distance of less than or equal to 1 cm, preferably less than or equal to 2 mm, more preferably less than or equal to 1 mm. The filter elements are preferably shaped as half cylindrical shells (halves) of a cylinder and the stirrer blades run past the inner and outer surfaces at a distance of less than or equal to 2 mm, preferably 1 mm, more preferably 0.75 mm. The stirrer which runs past the outer surfaces of the filter elements is preferably an anchor stirrer. The stirrer which runs past the inner surfaces of the filter elements is preferably a blade stirrer which preferably has from two to ten blades. The stirrer running past the filter-active surfaces of the filter elements at a prescribed distance prevents the buildup of a filter cake on the filter-active surface.

In a particularly preferred embodiment of the reactor of the invention, the filter elements are likewise shaped as parts or half cylindrical shells (halves) of a cylinder, with only the insides (inner surfaces) of the half cylinders having the filter-active material and thus representing the filter-active surface. The particular characteristic of this embodiment is that the filter elements form parts of the cylindrical reactor wall (shell) or even the entire reactor wall (shell). Once again, it is possible for two or more filter elements, preferably an even number of filter elements, to be present, with the switching of the filter elements as inlets and outlets being able to be carried out as described above. Once again, a stirrer which runs past the surface of the filter-active area of the filter elements at a distance of less than or equal to 1 cm, preferably less than or equal to 2 mm, more preferably less than or equal to 1 mm, from the surface of the filter elements is preferably present. In this embodiment of the process of the invention, the outlay in terms of apparatus is kept relatively small. This can be achieved, in particular, when only one stirrer which is shaped so that it runs past the surface of the filter-active areas of the filter elements at the prescribed distance and at the same time provides satisfactory mixing in the entire reactor is used.

It can be advantageous for the stirrer which is present to achieve homogeneous dispersion of the catalyst and the stirrer or stirrers which run past the inner or outer surfaces of the filter elements to run on one shaft. In this way, the outlay in terms of apparatus is kept very small. However, to achieve even better mixing, it can be advantageous for the stirrers to be provided with means of allowing contrarotation of the stirrers and/or operation of the stirrers at different speeds.

The reactors of the invention can be reactors for production plants, pilot plants or small apparatuses. Accordingly, the size of the reactors of the invention can vary in the range from 5 ml to above 100 $m^3$, with the size of the reactor or the volume of the reactor being able to be matched virtually freely to the conditions which are technically required. If the reactors are reactors which are used on an industrial scale, e.g. for the oligomerization of olefins, in particular butenes, the reactors according to the invention have a size ranging from a number of liters to hundreds of cubic meters, in particular from 0.1 $m^3$ to 200 $m^3$, preferably from 1 to 100 $m^3$ and very particularly preferably from 5 to 50 $m^3$. If the reactors according to the invention are, for example, laboratory reactors or reactors for high-throughput studies, it can be advantageous for the reactors to comprise reaction vessels having a volume of from 10 ml to 10000 ml, preferably greater than 50 ml and very particularly preferably greater than 100 ml.

The reactor of the present invention makes it possible to achieve a process for carrying out catalyzed liquid reactions continuously in at least one reactor in which the catalyst is present as a dispersion in the reaction zone, wherein the process is carried out in at least one reactor according to the invention. In this reactor, it is possible to carry out, for example, oligomerization, metathesis, alkylation or isomerization reactions and heterogeneous biocatalytic reactions as processes according to the invention. The reactor of the invention is particularly preferably used for carrying out heterogeneously catalyzed high-pressure liquid reactions, e.g. oligomerization of olefins, hydrogenation, metathesis, alkylation, isomerization and heterogeneously biocatalyzed reactions. A particular advantage of the use of the reactor of the invention is that, in particular, it is also possible to carry out processes in which the proportion of catalyst in the reactor can be above 20% by volume, preferably from 30 to 50% by volume. An upper limit to the proportion of catalyst is about 60-65% by volume, since at an even higher proportion of catalyst, the presence of a fluid medium is no longer ensured. Should a fluid medium (a dispersion) continue to be present at higher proportions of catalyst, the reactor of the invention and thus also the process of the invention can of course continue to be used.

The process of the invention is preferably carried out with the inflow and outflow to or from the reactor being switched over automatically so that inlet and outlet are exchanged when the pressure difference over the filter element increases to such an extent that the set flow through the reactor can be maintained only by increasing the pressure in the reactor by more than 5%, preferably more than 1%, particularly preferably more than 0.5%, over the initial pressure or the pressure after the last switch, or when a particular preset period of time after the last switch has elapsed. The period of time is preferably chosen so that it is less than or equal to the time which leads to a significant, measurable pressure increase. This time can, for example, be determined in simple preliminary tests. The pressure increase in the reactor can be measured, for example, by means of a pressure sensor in the reactor. Switching can be carried out manually. Particular preference is given to switching being carried out via a process control system which automatically triggers switching at an appropriate pressure in the reactor or after a presettable period of time. To simplify the engineering, it is advantageous for switching to occur periodically. Switching has to be carried out more or less frequently depending on the type and in particular the size of the catalyst used and the pore size of the filter element used. Switching is preferably carried out every 10 minutes to every 24 hours, preferably every 0.5 hour to every 12 hours.

The process of the invention can be, for example, the oligomerization of butenes in a temperature range from 50 to 150° C. and at pressures of from 10 to 70 bar. If this is, for example, carried out at volume flows of from 0.5 to 100 ml/min using a stainless steel mesh having a size of 3.2 cm×4.2 cm and a mesh opening of 5 μm and using a catalyst having a particle diameter of 15 μm, switching times of about 30 minutes have been found to be particularly preferred.

The process of the invention can also be carried out in two or more reactors according to the invention operated in parallel and/or in series.

In laboratory tests, the process is preferably carried out in from 2 to 50, preferably from 4 to 25 and very particularly preferably from 9 to 16, reactors operated in parallel. Carrying out the process of the invention in this way can be particularly advantageous when miniaturized reactors according to the invention are used.

The reactors operated in parallel in the process of the invention can be operated in the same way or in different ways. The reactors can all be supplied with the same feed mixture or the individual reactors or groups of the reactors operated in parallel can be supplied with different feed mixtures. The products obtained in the reactors can be worked up or analyzed individually. However, it is also possible to combine the products of all reactors or groups of reactors and to analyze or work up these combined products.

Apart from varying the composition of the starting materials, it can also be advantageous in the process of the invention to set the same reaction conditions or different reaction conditions in individual reactors or groups of the reactors operated in parallel which are supplied with identical or different feed compositions. The reaction conditions which can be varied in this way are preferably pressure, temperature and amount and/or type of catalyst used.

To carry out the parallel reactions, the reactors according to the invention are preferably arranged to form assemblies according to the invention which have at least two reactors according to the invention connected in parallel. The assembly preferably has from 2 to 50, preferably from 4 to 25 and very particularly preferably from 9 to 16, reactors connected in parallel. The inlets and outlets of the reactors are preferably equipped with a means of switching which allows the inlets and outlets to be exchanged when the pressure increase in the reactor is more than 5% over the initial pressure or the pressure at the last switch. The switching over of inlet and outlet can, however, also occur automatically after a preset period of time has elapsed.

In the assembly of the invention, identical or different feed mixtures can be fed to individual reactors or groups of the reactors operated in parallel. This can, for example, be carried out by means of a distributor or metering device. Likewise, the reactors present in the assembly according to the invention each have at least one means of setting reaction conditions. This can be, in particular, a heat exchanger which supplies the reaction mixture with heat or removes heat of reaction, so that, for example, isothermal or pseudoisothermal conditions can be set. Further means of setting the reaction conditions are, for example, pressure regulators, inflow and/or outflow regulators, etc. Depending on the application, the reactors arranged in parallel in the assembly of the invention can be completely independent of one another, in particular in respect of the starting materials and products (sealed from one another), or the supply of starting material or discharge of product can occur via a common inlet/outlet. The individual reactors are preferably sealed from one another to prevent fluid compounds from passing from one reactor to another, so that completely different reaction conditions can be set in the individual reactors.

The use of a plurality of reactors according to the invention operated in parallel or an assembly thereof according to the invention makes it possible for the process of the invention to be used for the rapid determination of optimum reaction parameters (high throughput screening). The opportunity of miniaturizing the reactors of the invention also makes these, in particular those having a volume of less than 100 ml, eminently suitable for use in high-throughput screening.

The present invention is illustrated by way of example by means of FIGS. 1 to 7, without being restricted thereto.

Figure 1:
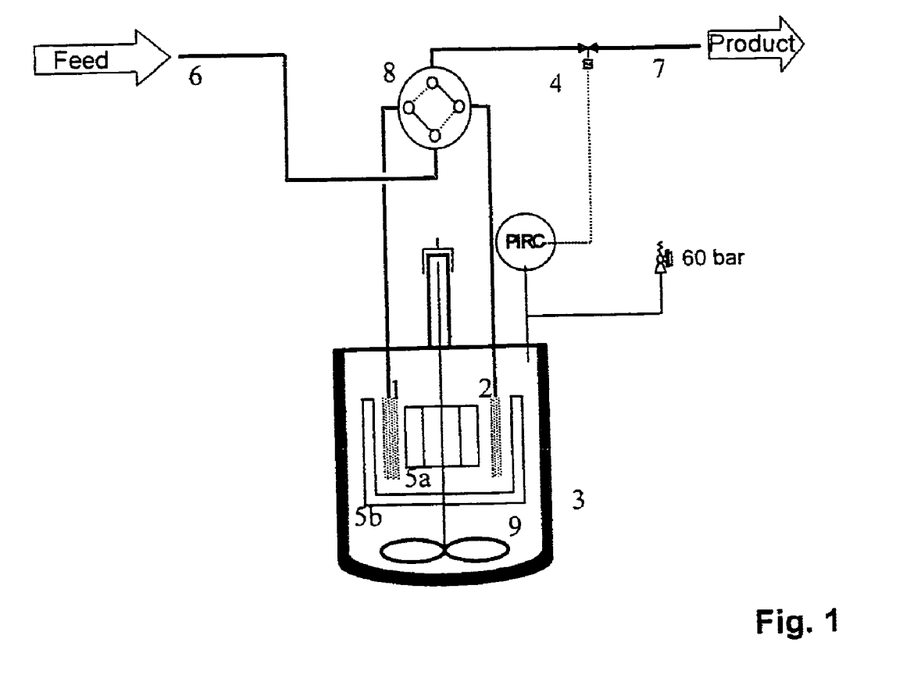

FIG. 1 illustrates, by way of example, the mode of operation of the apparatus of the invention for a liquid reaction over a solid catalyst. At least two filtration units (1 and 2) are located in a reaction zone (3) which preferably has the hydrodynamics of a continuous stirred tank reactor and can be operated at the necessary reaction pressure and the necessary reaction temperature. These can be filter-active media such as sintered metals, ceramics, ceramic composites, ceramic monoliths, polymer membranes, nonwoven, knitted or woven metal wire constructions. The liquid or a liquid saturated or enriched with gas is fed as feed (mixture) (6) to the reactor through the first filter unit (1). The reacted liquid (product) (7) is taken from the reactor again via the second filter unit (2). The pressure in the reactor can be maintained by means of an electromagnetically or pneumatically controlled pressure maintainence valve (4) installed downstream of the exit frit. In this way, the filter elements are subjected to virtually no pressure gradient and the mechanical stress on them is minimal. To clean the filter elements and to mix the contents of the reactor, a plurality of stirrers (5a, 5b and 9) are provided. Despite cleaning of the filter elements by means of the stirrers (5a and 5b), deep-bed filtration can result in blockage of the exit filter elements. For this reason, when a particular pressure increase is observed, the flow in the filter elements is reversed by means of a 4-way valve (8) so that inflow now occurs through filter (2) and outflow occurs through filter (1).

Figure 2:
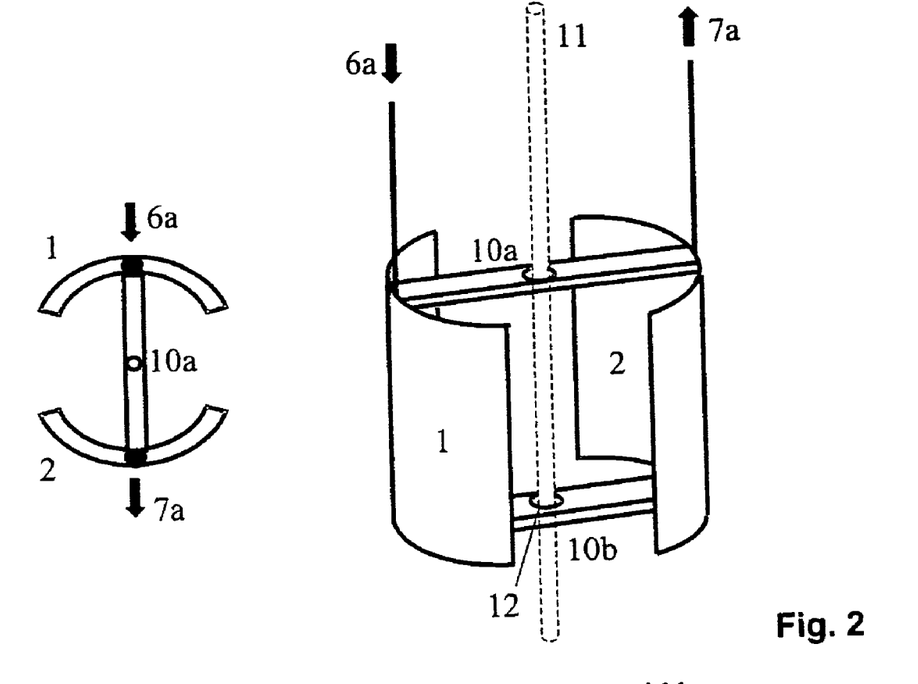

FIG. 2 shows a plan view and a side view of the filter elements (1) and (2) which are held in place relative to one another by means of two holders (10a and 10b) which each have a drilled hole. Arrows denote the incoming feed (6a)and the outflowing product stream (7a). A stirrer drive shaft (11) to which one or more stirrers can be fixed is shown by means of broken lines. To guide the stirrers better, the shaft can be mounted in a bearing (12) in one or both of the drilled holes (10a or 10b). This prevents possible eccentricity of the stirrers which can result in contact between the stirrers and filter units and thus possible damage to the filter units. Suitable bearing materials are, for example, bearing bronze or abrasion-resistant plastics.

Figure 3:
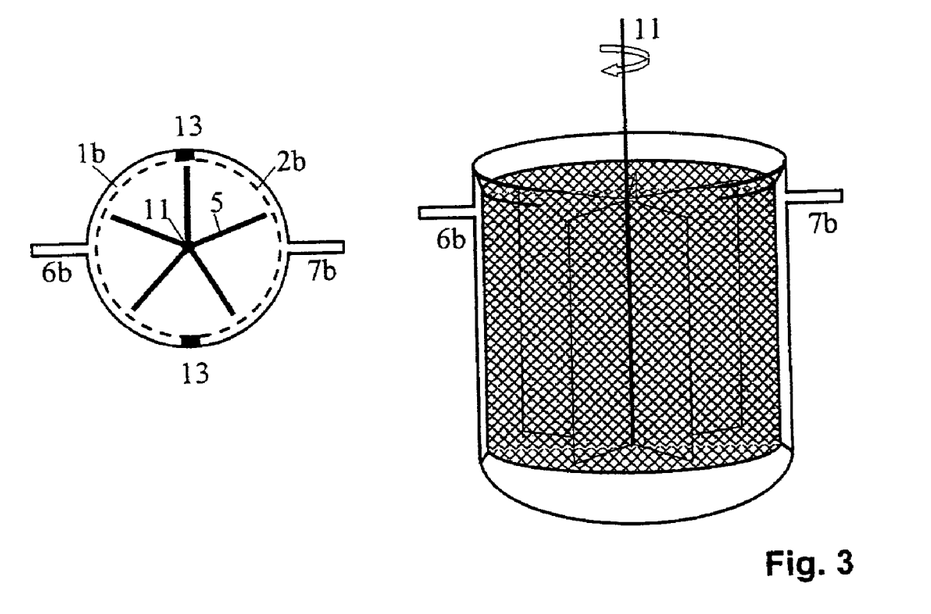

FIG. 3 schematically shows a plan view and a side view of an alternative construction of the reactor. The filter elements (1b and 2b)are in this case located as an inlay on the interior wall of the reactor. In this construction, one half (half of the cylinder plus optionally half of the bottom) of the interior wall of the reactor represents the first filter element 1b and the other half represents the second filter element 2b. The outer walls of the reactor are formed by the nonporous backing of the filter elements installed as inlay, or the outer wall of the reactor forms the nonporous backing of the filter element. Inlet (6b)and outlet (7b)or first and second filter element are separated from one another by impermeable barriers (13). The stirrer (5) in the middle serves to clean the filter surfaces and serves to mix the contents of the reactor and is driven via the shaft (11). This construction is particularly useful for carrying out reactions in the dispersion continuously according to the invention on a relatively large scale.

Figure 4:
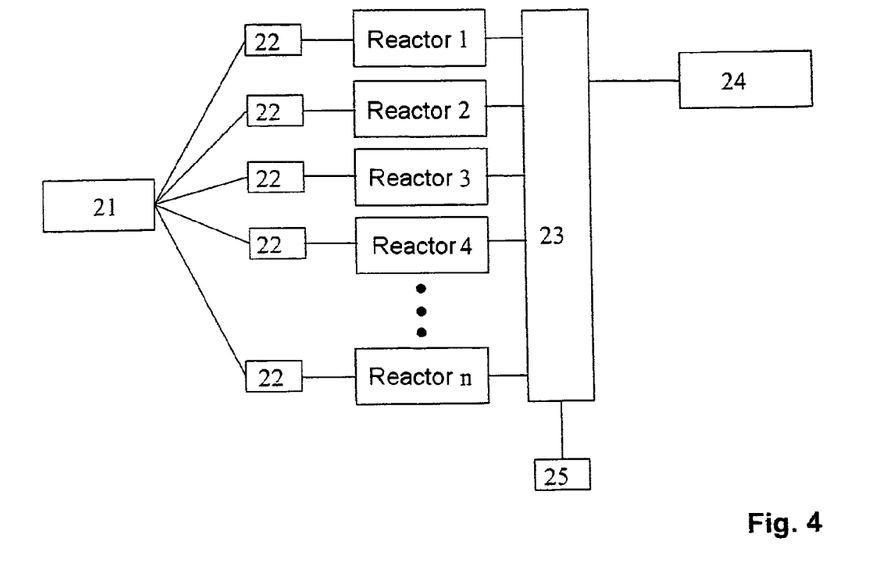

FIG. 4 shows, by way of example, an assembly of n reactors according to the invention with flow switching as shown in FIG. 1 or 3. The feed to the reactors (21) is metered by means of regulators (22) and fed in the desired amount into the reactors. The fluids leaving the reactor are fed into a selector (23) in which the outflow from one of the reactors is selected and can be passed to an analytical facility (24), e.g. a gas chromatograph or a mass spectrometer or another analytical instrument. The other streams are passed to disposal (25) or to other analyzers.

Figure 5:
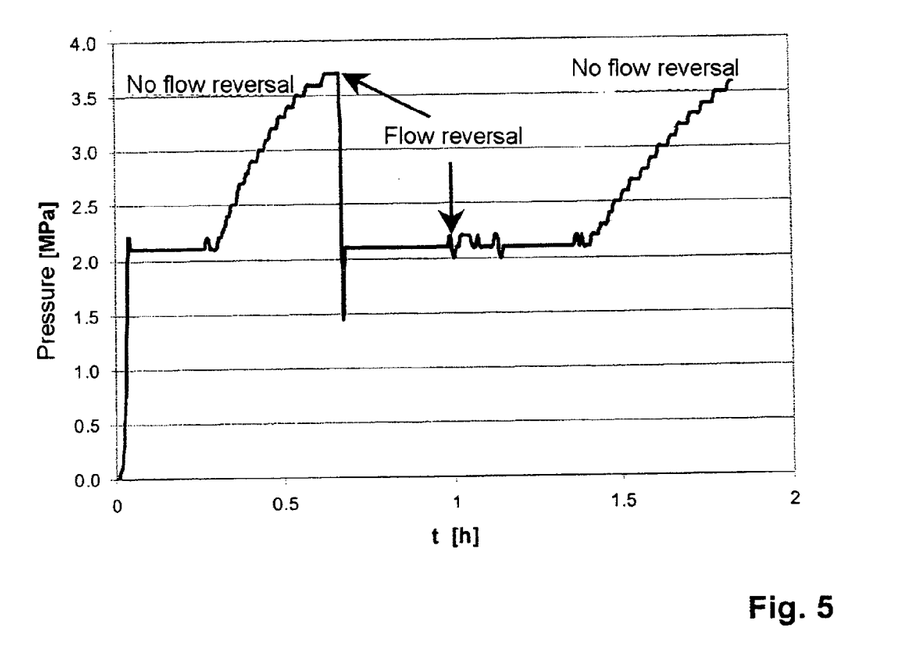

FIG. 5 shows a graph in which the measured pressure is plotted against the time of operation. The experiment was carried out as described in Example 2, except that the flow direction was reversed once after 0.7 hour and once after 1 hour. It can clearly be seen that after the reaction pressure has been set after about 0.05 hour, the pressure initially remains constant until after about 0.3 hour it increases steadily, which is attributable to blocking of the filter-active layer. Switching the flow and thus flushing the filter-active layer after about 0.7 hour brings the reaction pressure back to the initial value. A preventive switch after one hour leaves the reaction pressure initially constant, until at about 1.45 hours the pressure rises steadily once again. This experiment shows, firstly, that switching the flow direction can reverse blocking of the filter-active layer and, secondly, that blocking can be avoided by means of timely preventive switching.

Figure 6:
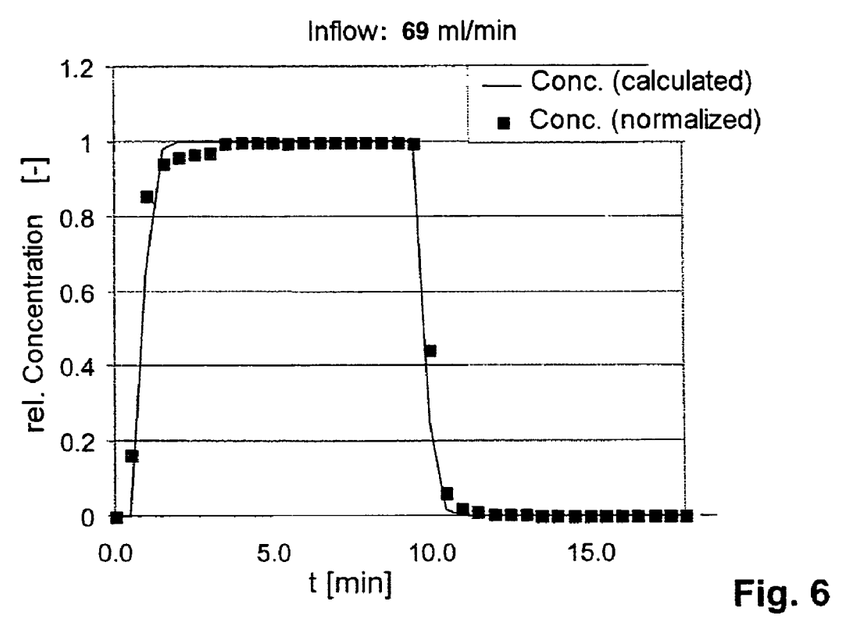
Figure 7:
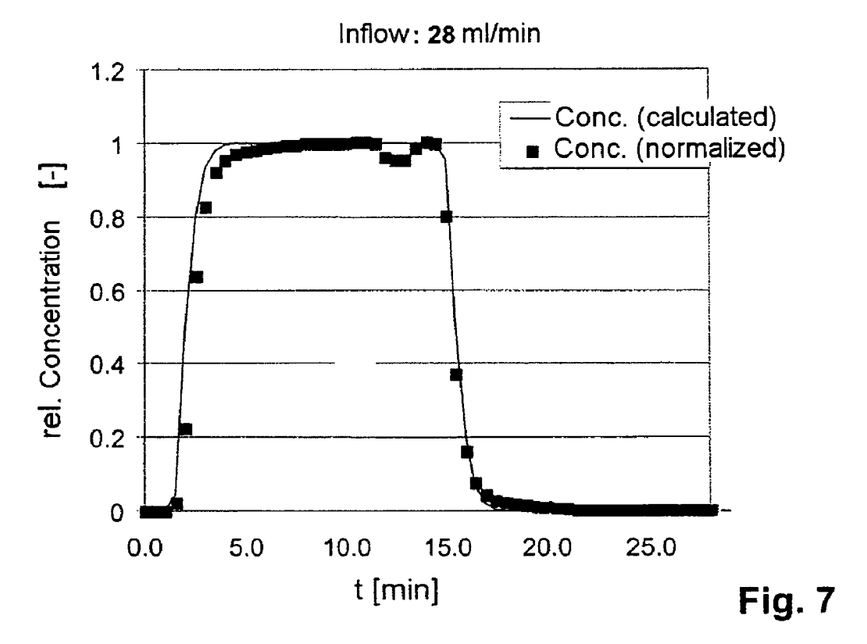

FIGS. 6 and 7 show the residence time curves for a test substance in the reactor according to the invention of Example 2 and, in comparison thereto, the residence time curves of the model of an ideal continuous stirred tank reactor for two different volume flows of feed. FIG. 6 shows the curves for a volume flow of 69 ml/min and FIG. 7 shows the curves for a volume flow of 28 ml/min. The experimentally determined and normalized values are each shown as black squares. The calculated values are shown as a line. As can be seen from the graphs, the shapes of the experimental and calculated curves display no significant differences. It can therefore be assumed that the hydrodynamic behavior of the reaction vessel provided with the filter elements and stirrers corresponds approximately to that of an ideal continuous stirred tank reactor.

The following examples illustrate the invention without restricting its scope which is defined by the description and the claims.

EXAMPLES

To test the flow behavior of the reactor of the invention, a dispersion of 20% by weight of silicate powder having a $d_{50}$ of 25 µm in hexane (technical-grade n-hexane, Aldrich) was used in the following experiments (examples 1 and 2). This was placed in the reactor at the beginning. A particular hexane flow was then fed at a pressure of 22 bar through the inlet into the reactor and was taken off again via the outlet.

Example 1

A filter combination comprising two filter units as depicted in FIG. 2 installed in a 300 ml stirred tank reactor (Büchi) was used. The filter units have a filter-active area of 2.8 cm×3.8 cm in each case on the insides. The cross section of inlet and outlet was in each case 1/8". The distance from the filter-active surface to the back of the filter element was likewise 1/8" in each case. The filter-active surface consisted of a stainless steel mesh/stainless steel screen having a mesh opening of 5 µm. The filter elements were joined to one another by means of two stainless steel holders which each have a drilled hole for the stirrer shaft and keep the inner surfaces 3.4 cm apart. The stirrer shaft was passed centrally between the filter elements, so that the blade stirrer (5a) (5-blade stirrer, height=3 cm, width of the individual blade=1.7 cm, V4-A steel) attached thereto always passes over the porous inside of the cylindrical filter elements at the same distance of 0.5 mm. In addition, an impeller stirrer having 4 blades (angle to the flow direction: 15°) was affixed to the lower end of the shaft to ensure a substantially homogeneous distribution of the disperse phase. The shaft rotated at a speed of 1000 rpm. At a filter area of 10.6 cm$^2$ per filter unit, flows of up to 50 ml/min (hexane) could be achieved at a proportion by volume of solids of 20% by volume (silicate powder, $d_{50}$=15 µm) in long-term operation (>1000 h). The switching valve was triggered every 30 minutes to backflush blockages within the pores of the screen. Without backflushing, the permeability of the filter decreased after periods of operation of over 0.5 hour under the conditions described and the pressure observed in the reactor increased.

Example 2

To increase the filter area, filter elements in which the outside of the cylindrical shell was also configured as a screen were used in a second example. The filter elements are once again soldered together via a stabilizing rod. To avoid buildup of a filter cake on the outer filter surface, an additional stirrer (e.g. an anchor stirrer (5b)) which ran on the same shaft as the blade stirrer and passed over the outside of the filter elements at a distance of 0.5 mm was necessary. At a filter area of 21.4 cm$^2$ per filter unit, flows of up to 100 ml/min (hexane) can be achieved at a proportion by volume of solids of 20% by volume (silicate powder, $d_{50}$=15 µm) in long-term operation (>1000 h). The switching valve was triggered every 30 minutes to backflush blockages within the pores of the screen. Without backflushing, the permeability of the filter drops at periods of operation above 0.5 hour under the conditions described, which is indicated by a pressure increase in the reactor (cf. FIG. 5). An impeller stirrer is attached to the stirrer shaft below the filter elements in the vicinity of the bottom, as described in example 1, to convey the suspended solid upward in the direction of the filter elements. In this way, a uniform distribution of solids throughout the entire reactor is achieved.

In both examples, no visible filter cake formation was observed (observed in-situ by use of a glass reactor) at stirrer gaps<=1 mm. Despite the internals, the reactor displays hydrodynamics comparable to those of an ideal continuous stirred tank reactor at a sufficiently high speed of rotation (dependent on the flow rate). This was demonstrated by a comparison of the residence time curves of a test substance with those of the model of an ideal continuous stirred tank reactor (FIGS. 6 and 7). As can be seen from the graphs in FIGS. 6 and 7, the two curves show no differences.

Example 3

In a reactor as described in example 1 provided with a built-in filter combination from example 2, the oligomerization of butenes (77.4% by weight of linear butenes and 22.6% by weight of fluid compounds which are inert under the reaction conditions) was examined at 80° C. or 96° C. and a pressure of 25 bar (the values obtained at 96° C. are shown in brackets below). The volume flow was about 5 ml/min. As catalyst, use was made of 25 g of a catalyst of the type used for oligomerization in example 2 of DE 39 14 817 (mean particle size $d_P$=15 µm). A conversion to $C_8$ to $C_{20}$ oligomers of 25% (32%) was observed. Every 30 minutes, the feed was switched over automatically between the two filter elements. The experiment ran for 2000 hours without noticeable blocking of the filter elements.

The invention claimed is:

1. An assembly including a reactor, the reactor comprising:
   a reaction zone configured to hold a dispersion catalyst and carry out a process, the process having a catalyzed liquid reaction;
   at least one inlet configured to feed reaction ingredients into the reaction zone;
   at least one outlet configured to discharge all reaction products from the reaction zone;
   a switching device configured to allow an inlet flow direction for the inlet and an outlet flow direction for the outlet to be switched so that an exit that has previously served as the outlet is utilized as an entrance serving as the inlet and at a same time an entrance that has previously served as the inlet is utilized as an exit serving as the outlet;

the inlet includes a first filter element and the outlet includes a second filter element that keeps the dispersion catalyst in the reaction zone, the first and second filter elements being shaped substantially similar to a cylinder;

a first stirrer configured to provide a homogeneous distribution of the dispersion catalyst and the population of all reaction ingredients in the reaction zone; and a second stirrer including a plurality of second stirrer proximity surfaces configured to rotate past an inner and/or outer surface of the first filter element at a distance of less than or equal to one centimeter, and the plurality of second stirrer proximity surfaces configured to rotate past an inner and/or outer surface of the second filter element at a distance of less than or equal to one centimeter.

2. An assembly according to claim 1, wherein the switching device includes a four-way valve having a set of two pairs of connected exits.

3. An assembly according to claim 2, wherein the reactor includes the switching device that makes it possible to switch the inlet and the outlet flow directions when a pressure increase in the reactor is more than 5% over an initial pressure, or when a pressure increase in the reactor is more than 5% over a pressure after a last switch.

4. An assembly according to claim 3, wherein the reactor includes the switching device to switch the inlet and the outlet flow directions automatically after a preset period of time has elapsed.

5. An assembly according to claim 1, wherein the first and second filter elements each include one of the following as a filter-active material: a sintered metal frit, a ceramic frit, a ceramic composite, a ceramic monolith, a polymer membrane, a nonwoven metal wire construction, or a woven wire construction.

6. An assembly according to claim 1, wherein the reactor includes a facility for introducing or removing heat energy from the reactor.

7. An assembly according to claim 1, wherein the first and second filter elements are each shaped as a half cylindrical wall of a cylinder and a third stirrer includes a plurality of third stirrer proximity surfaces that rotate past the inner and/or outer surface of the first filter element at a distance of less than or equal to two millimeters, and the third stirrer proximity surfaces configured to rotate past the inner and/or outer surface of the second filter element at a distance of less than or equal to two millimeters.

8. An assembly according to claim 7, wherein the second and third stirrers contrarotate with respect to each other.

9. An assembly according to claim 7, wherein the second stirrer is an blade stirrer, the blade stirrer configured to rotate about a first stirrer axis of rotation, the blade stirrer having a plurality of blades that are attached at the first stirrer axis of rotation, each of the plurality of blades having one of the plurality of second stirrer proximity surfaces.

10. An assembly according to claim 9, wherein the third stirrer is an anchor stirrer, the anchor stirrer configured to rotate about a second stirrer axis of rotation, the anchor stirrer having a plurality of anchor blades that are attached at the second stirrer axis of rotation, each of the plurality of anchor blades having one of the plurality of third stirrer proximity surfaces, the plurality of third stirrer proximity surfaces rotate about a portion of the first and second filter elements during a full rotation of the third stirrer, and the plurality of third stirrer proximity surfaces rotate about a portion of the second stirrer during a full rotation of the third stirrer.

11. An assembly according to claim 1, wherein the first and second filter elements are each shaped as a half cylindrical wall of a cylinder that represents the half cylindrical walls of the filter-active area, the filter elements are part of the reactor wall.

12. An assembly according to claim 1, wherein the process is an oligomerization, metathesis, alkylation or isomerization reaction, or a heterogeneous biocatalytic reaction.

13. An assembly according to claim 1, wherein a proportion of the dispersion catalyst in the reactor is more than 20% by volume.

14. An assembly according to claim 1, wherein the reactor includes a plurality of reactors operated in parallel, and wherein the assembly also comprises:

a metering device configured to feed a variety of different feed mixtures to individual reactors or groups of reactors; and a selector configured to receive a fluid from one of the plurality of reactors and to transfer the fluid to an analytical facility.

15. An assembly according to claim 14, wherein the plurality of reactors each include a capability for setting reaction conditions.

16. An assembly according to claim 15, wherein the reactors are sealed from one another to prevent transfer of fluid compounds from one reactor to another.

17. An assembly according to claim 14, wherein the reactor is configured to carry out a high-throughput screening.

* * * * *